(12) United States Patent
Ddamulira et al.

(10) Patent No.: US 9,394,701 B2
(45) Date of Patent: Jul. 19, 2016

(54) CARRIER-FREE ADHESIVE FILM

(71) Applicant: W.F. Taylor Co., Inc., Fontana, CA (US)

(72) Inventors: Robert Kintu Ddamulira, Chattanooga, TN (US); John Edmund Raidy, Jr., Pasadena, CA (US); Barry Kenneth Wright, Rosewell, GA (US)

(73) Assignee: W.F. Taylor LLC, Dover, DE (US)

( * ) Notice: Subject to any disclaimer, the term of this patent is extended or adjusted under 35 U.S.C. 154(b) by 224 days.

(21) Appl. No.: 14/285,046

(22) Filed: May 22, 2014

(65) Prior Publication Data
US 2014/0251526 A1  Sep. 11, 2014

Related U.S. Application Data (63) Continuation of application No. 12/764,768, filed on Apr. 21, 2010, now abandoned.

(60) Provisional application No. 61/171,747, filed on Apr. 22, 2009.

(51) Int. Cl.
| | |
|---|---|
| *E04F 15/00* | (2006.01) |
| *B44C 1/17* | (2006.01) |
| *B29C 65/54* | (2006.01) |
| *B32B 37/12* | (2006.01) |
| *B32B 37/26* | (2006.01) |

(Continued)

(52) U.S. Cl.
CPC ............... *E04F 15/163* (2013.01); *B32B 37/12* (2013.01); *C08L 21/02* (2013.01); *C09J 7/00* (2013.01); *C09J 7/0228* (2013.01); *E04F 15/02155* (2013.01); *B29C 65/4825* (2013.01); *B29C 65/4855* (2013.01); *B29C 65/5057* (2013.01); *B29C 66/7487* (2013.01); *B29K 2309/06* (2013.01); *B29K 2311/14* (2013.01); *C08K 5/01* (2013.01); *C09J 2203/314* (2013.01); *C09J 2205/102* (2013.01); *C09J 2483/005* (2013.01); *Y10T 156/10* (2015.01); *Y10T 428/1476* (2015.01)

(58) Field of Classification Search
USPC ........... 156/71, 230, 231, 238, 245, 247, 249, 156/289, 297, 299, 300; 428/40.1, 41.8, 428/42.2, 42.3
See application file for complete search history.

(56) References Cited

U.S. PATENT DOCUMENTS

| | | |
|---|---|---|
| 4,223,067 A | 9/1980 | Levens |
| 4,522,870 A | 6/1985 | Esmay |

(Continued)

FOREIGN PATENT DOCUMENTS

| | | |
|---|---|---|
| DE | 4319023 C1 | 9/1994 |
| JP | 04-057871 A | 2/1992 |
| WO | 2006/027388 A1 | 3/2006 |

OTHER PUBLICATIONS

Extended European Search Report issue on Aug. 3, 2015 in European Patent Application No. 10767709.8.

(Continued)

*Primary Examiner* — Sing P Chan
(74) *Attorney, Agent, or Firm* — Stroock & Stroock & Lavan LLP (57) ABSTRACT

A method of installing flooring with an adhesive system that comprises a layer of adhesive without any adhesive carrier layer or screen or the like, covered on a first release surface and covered on the opposite side by a second release surface.

25 Claims, 5 Drawing Sheets

(51) Int. Cl.
  *B32B 43/00*    (2006.01)
  *E04F 15/16*   (2006.01)
  *C09J 7/00*     (2006.01)
  *E04F 15/02*   (2006.01)
  *C09J 7/02*     (2006.01)
  *C08L 21/02*    (2006.01)
  *B29C 65/50*    (2006.01)
  *B29C 65/00*    (2006.01)
  *B29K 309/06*   (2006.01)
  *B29K 311/14*   (2006.01)
  *B29C 65/48*    (2006.01)
  *C08K 5/01*     (2006.01)

(56) References Cited

U.S. PATENT DOCUMENTS

| | | |
|---|---|---|
| 4,556,595 A | 12/1985 | Ochi |
| 4,842,902 A | 6/1989 | Brown et al. |
| 5,096,777 A | 3/1992 | Schacht et al. |
| 5,116,439 A | 5/1992 | Raus |
| 5,120,587 A | 6/1992 | McDermott, III et al. |
| 5,576,356 A * | 11/1996 | Leir .......... C09D 4/06 522/148 |
| 5,597,618 A | 1/1997 | Bayer, Jr. et al. |
| 5,660,922 A | 8/1997 | Herridge et al. |
| 5,830,549 A | 11/1998 | Sweet et al. |
| 5,868,891 A | 2/1999 | Weir et al. |
| 6,017,624 A | 1/2000 | Delgado et al. |
| 6,121,166 A | 9/2000 | Wood et al. |
| 6,143,118 A * | 11/2000 | Hornaman .......... B32B 37/1284 156/230 |
| 6,180,166 B1 | 1/2001 | Wood et al. |
| 6,586,066 B1 | 7/2003 | Buckwalter et al. |
| 6,838,142 B2 | 1/2005 | Yang et al. |
| 6,854,241 B1 * | 2/2005 | Pelosi, Jr. .......... A47G 27/0468 52/746.1 |
| 7,108,910 B1 | 9/2006 | Smith, Sr. et al. |
| 7,464,510 B2 | 12/2008 | Scott et al. |
| 7,799,895 B2 | 9/2010 | Ddamulira et al. |
| 2004/0101679 A1 | 5/2004 | Mertz et al. |
| 2004/0185249 A1 | 9/2004 | Junghans et al. |
| 2005/0075428 A1 | 4/2005 | Ddamulira et al. |
| 2006/0251890 A1 | 11/2006 | Lane et al. |
| 2006/0263596 A1 | 11/2006 | Bamborough et al. |
| 2008/0064852 A1 | 3/2008 | Ddamulira et al. |
| 2009/0032180 A1 | 2/2009 | O'Connor |
| 2009/0053447 A1 | 2/2009 | Zollner et al. |

OTHER PUBLICATIONS

Sigaway Original Product Information, Tek Stil Concepts, dated Feb. 24, 2009.

International Search Report and Written Opinion, mailed Jun. 29, 2010 for PCT International Application No. PCT/US2010/031913, filed on Apr. 21, 2010.

* cited by examiner

CARRIER-FREE ADHESIVE FILM

CROSS-REFERENCE TO RELATED APPLICATIONS

This application is a continuation of U.S. application Ser. No. 12/764,768, filed Apr. 21, 2010, which claims priority to U.S. Provisional Patent Application No. 61/171,747, filed on Apr. 22, 2009, the contents of each of which are incorporated herein by reference in their entireties.

BACKGROUND OF THE INVENTION

The invention relates generally to adhesive systems, and more particularly to those used to adhere flooring such as carpet, carpet tile (with various backings which include PVC, Polyolefin, polyurethane etc), vinyl composition tiles (VCT), luxury vinyl tiles and plank (LVT), wood, laminate floors, carpet padding and other flooring materials that can be secured in place with adhesive layers. The invention also generally relates to methods of making and using such adhesives.

There are generally two types of adhesives: two-component adhesives, and one-component adhesives. Two-component adhesives are generally formed with a resin component and a hardener component. In two-component adhesives, the resin and hardener are mixed immediately prior to application, causing a chemical reaction that permits the two-component adhesive to adhere to a substrate or surface. By contrast, one-component adhesives are typically solvent-based adhesives wherein an adhesive composition is mixed with a solvent. After the one-component adhesive is applied to a substrate or surface, the solvent evaporates, which permits the adhesive to cure. Examples of one-component adhesives that are known in the art include the adhesives described in U.S. Pat. Nos. 6,706,789 and 6,881,775, the contents of which are incorporated herein by reference. Others are UV curable, pressure curable or otherwise.

Many products are assembled using adhesives. For example, various flooring products made from wood, vinyl, tile, carpet and so forth are permanently adhered to a surface or substrate, such as concrete or plywood flooring, through the use of an adhesive. Commonly-used adhesives in such applications include those sold under the trademarks Taylor Enviotec 2027 Pressure Sensitive Adhesive, which is sold by W.F. Taylor Co. of Fontana, Calif.

Traditionally, the adhesive is applied to the underlying substrate (such as plywood, concrete, and the like) with a notched trowel, or paint roller that meters the prescribed amount of adhesive to produce an adequate bond, or sprayed on to the floor using a spraying device. The flooring material is then applied over the adhesive in order to secure the flooring material to the substrate. The process can be time consuming, messy, and difficult to accomplish, particularly in large applications. These methods require the installer to be skilled in making sure that the proper tools are both selected and used correctly, and ensuring that the correct amount of adhesive is applied; otherwise the installation may fail.

After the application of the adhesive on the floor, the adhesive has to be allowed to dry to a pressure sensitive (tacky) state before the flooring covering can be installed. This process can take as long as several hours before the adhesive is ready to receive the floor covering. Failure to wait for this period can result in installation failure which can be very costly.

During this drying period the adhesive vehicle (which can be water, VOC's or in some cases noxious solvents) will escape to the atmosphere resulting in unpleasant odors in the installation environment and toxic fumes which sometimes produces a "sick building" syndrome. There is also the danger of that some of the adhesive may go on the face of the floor covering and damage it. Also most of these adhesive products are packaged in plastic containers that are not bio-degradable, at the end of their life cycle these containers can contribute to environmental pollution.

Some floor covering materials such as wood and carpet with vinyl or polyolefin backing are sensitive to moisture and solvent contained in the wet adhesive. When these products come into contact with these chemicals they can be damaged.

It is desirable to improve the versatility, cost and complexity of using adhesives to apply a variety of materials, and in particular, flooring materials. In view of the foregoing, there is a need for improved materials and methods for securing flooring and other products to a substrate with an adhesive.

SUMMARY OF THE INVENTION

The invention relates generally to adhesives, such as flooring adhesives, and more particularly to peel and press type adhesives and adhesive sheets. Generally speaking, in accordance with the invention, an adhesive sheet is provided that comprises a layer of adhesive, preferably without any adhesive carrier layer or screen or the like, covered on a first side by a first release liner, and covered on the opposite side by a second release liner. The first release liner generally includes a first release carrier having a first release agent on one side thereof. The first release liner is positioned over the adhesive such that the first release agent is in contact with the adhesive. The second release liner generally includes a second release carrier having a second release agent on one side thereof. The second release liner is positioned over the adhesive such that the second release agent is in contact with the adhesive.

The first and second release carriers may be formed from any suitable material or mixture of materials, such as paper, plastic (including polypropylene, polyethylene or polyester), and the like. In addition, the first and second release carriers may be formed from the same or different material as a matter of design choice.

The first and second release agents may be any cross-linkable silicone, or other coatings or materials that have a desired surface energy. The first and second release agents may be the same or different materials, and in a preferred embodiment of the invention, the first and second release agents have different surface energies. In an embodiment of the invention, the first release agent is a relatively strong release agent and has a lower surface energy than the second relatively weak release agent. In this manner, the first release liner can be removed from the adhesive layer, leaving the adhesive layer on the second release liner. The adhesive can then be pressed onto the surface to be covered, and then the second release liner can be removed leaving a layer of adhesive behind.

In another embodiment of the invention, the release liner can have the first and second release agents on opposite sides of a single release liner. In this manner, the adhesive layer is disposed on the weak release agent side and the combination can be formed into a roll, with the strong release agent facing the outside of the roll and promoting easy unrolling of the roll, exposing a surface of the adhesive layer as the roll unrolls. The exposed side of the adhesive layer can then be pressed onto a substrate and the release liner removed by peeling the relatively weaker release agent surface from the top of the adhesive layer, with the bottom on the flooring substrate. Flooring can then be adhered to this top exposed surface of the adhesive layer.

The adhesive system according to the invention can include an oil component, it can include a hydrocarbon resin component, it can include a surfactant component, and it can include a latex polymer component having carboxyl functionality, or any combination thereof. The adhesive may also include other components including, without limitation, anti-foaming agents, fugitive anti-oxidants, bactericides, fungicides, freeze-thaw stabilizers, wetting agents, fugitive alkali agents and tackifying resins. The adhesive can also be formulated using bio-based, renewable raw materials with low or substantially no VOC emissions. A standard fossil-based adhesive can also be used.

BRIEF DESCRIPTION OF THE DRAWINGS

In the drawing figures, which are merely illustrative.

DETAILED DESCRIPTION OF THE PREFERRED EMBODIMENTS

The invention is directed to adhesives and adhesive sheet systems for use in securing various flooring materials to a substrate. The invention is also directed to methods of applying such adhesive sheets and to applying flooring materials with such adhesive sheets. The invention is also directed methods of making such adhesive sheets.

Various ingredients and components may be used in the adhesive sheets of the present invention, including those set forth in the exemplary embodiments described below. However, as will be evident to those of ordinary skill in the art, substitutions, omissions and additions to these ingredients and components will be possible in order to provide adhesive sheets having customized selected properties without departing from the scope of the invention.

One method of installing floor covering material involves an adhesive carrier sheet or screen that has a pressure sensitive adhesive on both sides. This adhesive/carrier combination is adhered to the floor and the floor covering material is installed directly on top of it. The inventors determined that the use of a carrier layer presents several disadvantages. This method can be expensive because of the added cost of the carrier and it also requires special procedures for a successful installation. Providing a screen or carrier layer involves additional costs, including the cost of the carrier/screen material and the cost of the labor and equipment required to incorporate the carrier layer into the adhesive sheet. Second, the carrier layer adds complexity to the adhesive sheet, increasing the likelihood that defects will develop during manufacture or use. Third, a carrier layer increases the thickness of the adhesive sheet.

Another problem can develop because the carrier layer or screen can reduce the malleability and conformability of the adhesive layer. When a carrier based adhesive sheet is applied to a floor, there are often regions of overlap between two adjacent strips of the adhesive sheet. These regions present an adhesive surface that is further away from the underlying substrate (i.e., the base floor onto which the adhesive sheet is applied) than the adhesive surface presented by the non-overlapping regions. Accordingly, when flooring material is placed onto the adhesive surface, there are often undesirable, uneven "bumps" or ridges located on or around the overlapping regions. This can also result from unevenness in the sub-floor and the relative stiffness of carrier based adhesive sheets. The magnitude of these bumps and/or ridges depends on the thickness, malleability and conformability of the adhesive sheet. Therefore, the inventors determined that the presence of a carrier/screen layer can increase the magnitude of these undesirable bumps.

Figure 1:
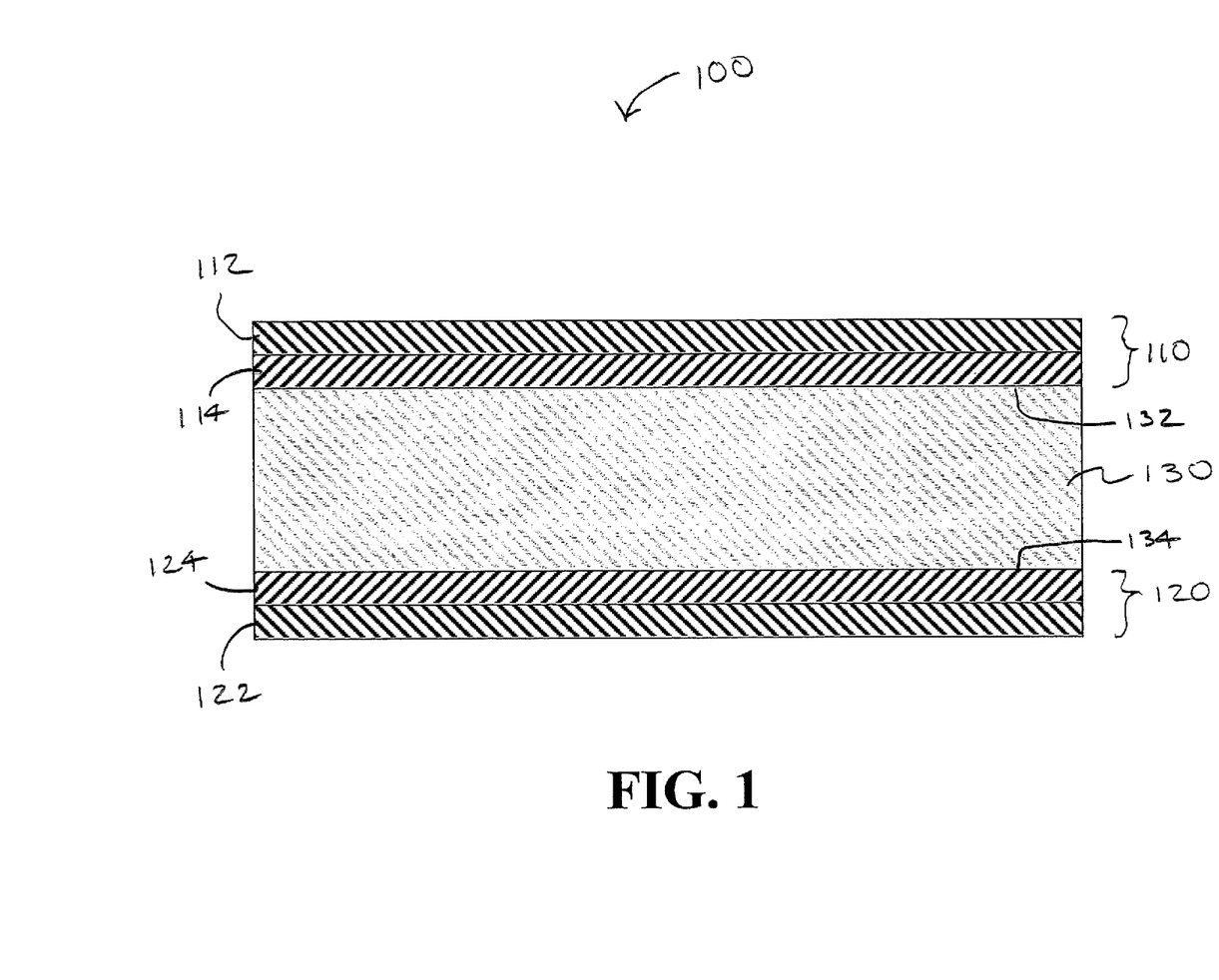
FIG. 1 depicts an adhesive sheet according to an embodiment of the invention.

An adhesive system in accordance with a preferred embodiment of the invention is shown generally as adhesive sheet 100 FIG. 1. Adhesive sheet 100 comprises an adhesive layer 130 covered on a first side (or surface) 132 by a first high release liner 110. Adhesive layer 130 is also covered on the opposite side (or surface) 134 by a second low release liner 120. First high release liner 110 generally includes a first release carrier 112 having a first high release agent 114 on one side thereof. First high release agent 114 has relatively low surface energy (high release properties). First high release liner 110 is positioned over adhesive 130 such that first high release agent 114 is in contact with adhesive 130 at side 132.

Second low release liner 120 generally includes second release carrier 122 having a second low release agent 124 on one side thereof. Second low release agent 124 preferably has higher surface energy and therefore lower release properties compared to high release agent 114. Second low release liner 120 is positioned over adhesive 130 such that second low release agent 124 is in contact with adhesive 130 at side 134. Release agents 114 and 124 are preferably selected with different surface energies so that adhesive layer 130 will adhere to low release liner 120 when high release liner 110 is pealed off, to thereby expose adhesive layer surface 132.

First and second release carriers 112 and 122 may be formed from any suitable material or mixture of materials, such as paper, plastic (including polypropylene, polyethylene or polyester), and the like. In addition, first and second release carriers 112 and 122 may be formed from the same or different material as a matter of design choice. First and second release agents 114 and 124 may be any cross-linkable silicone, or other coatings or materials that have a desired surface energy. First and second release agents 114 and 124 may be the same or different materials, and in preferred embodiments of the invention, first and second release agents 114 and 124 have different surface energies.

Figure 2:
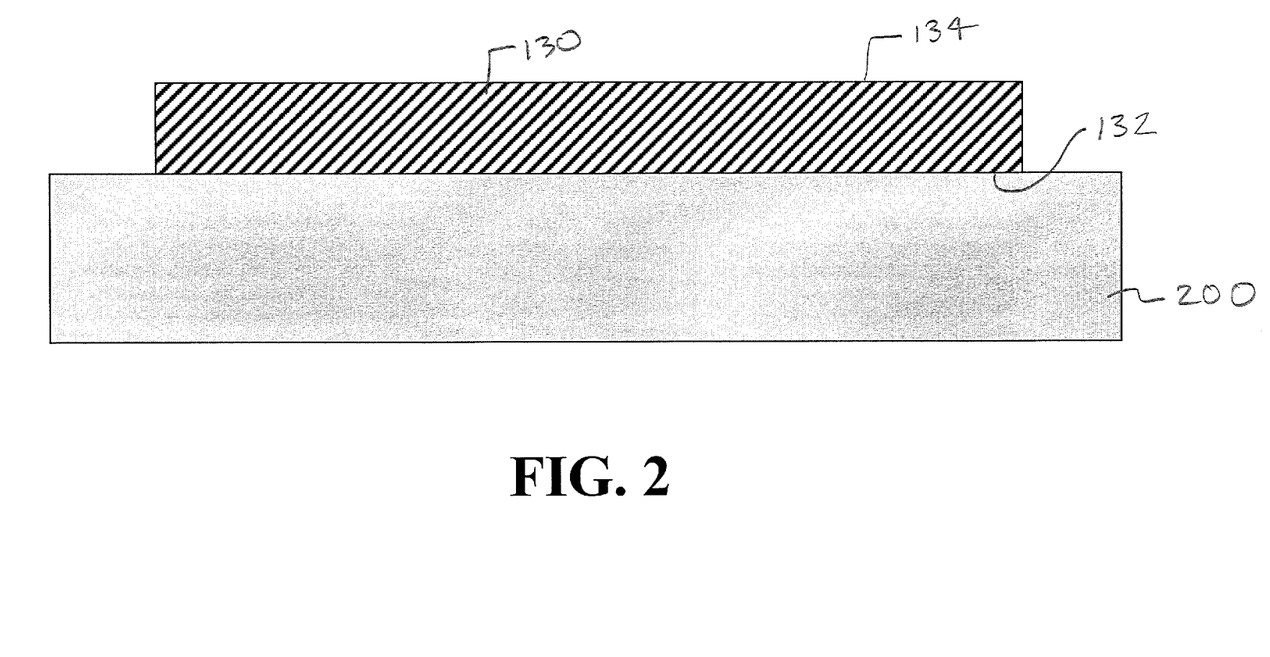
FIG. 2 depicts an adhesive layer from the adhesive sheet of FIG. 1 applied to a substrate according to an embodiment of the invention.

FIG. 2 depicts adhesive 130 applied to a substrate 200. To install adhesive 130 on substrate 200, first high release liner 110 can be removed from adhesive sheet 100. Adhesive 130 will remain on second release liner 120 in view of the relative difference in surface energy between the first and second release agents. Surface 132 of adhesive 130 can then be pressed onto substrate 200. Then, second low release liner 120 can be removed, leaving a carrier and screen free layer of adhesive 130 behind on substrate 200. The flooring material (not shown) can then be applied to surface 134 of adhesive 130.

In another embodiment of the invention, the low and high release agents are disposed on opposite surfaces of a single release liner. The adhesive can be coated onto the low release (higher surface energy) side, to form an adhesive layer thereon. The coated liner is then rolled, with the high release surface on the outside of the roll, so that the coated liner can be unrolled, with the adhesive layer remaining on the low release surface. It can then be pressed onto the flooring substrate and the single release liner removed by peeling away the low release surface form the adhesive layer. The flooring can then be adhered to the now exposed top surface of the adhesive layer.

Figures 3A, 3B:
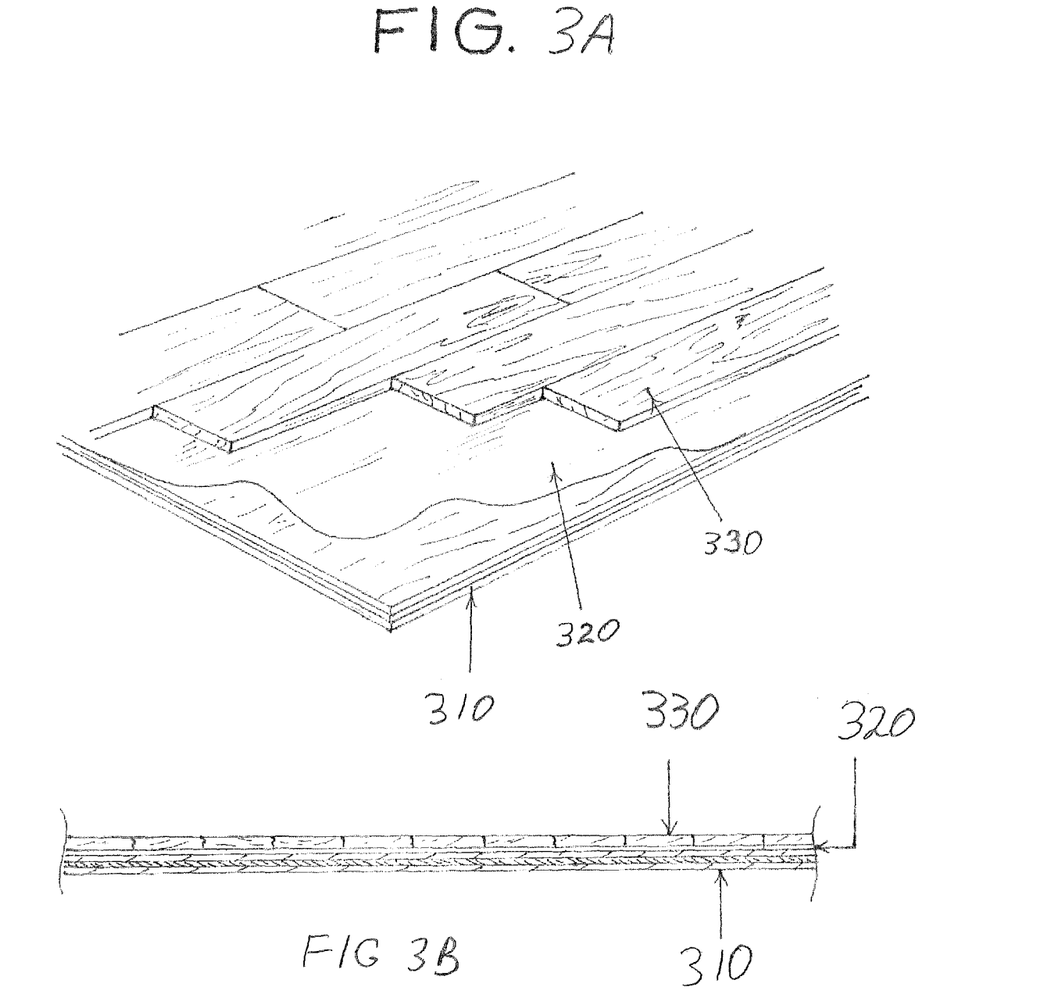
FIGS. 3A and 3B are a perspective cut-away and a cross sectional view of a wood flooring installation according to an embodiment of the present invention.

FIG. 3A is a perspective cut-away view and FIG. 3B is a cross section view of a wood flooring installation according to an embodiment of the present invention. A substrate 310 represents a flooring substrate that can be of the following construction; wooden, concrete, wooden and covered with an existing floor covering material, or concrete covered with an existing floor covering material. A carrier free adhesive film 320 is applied over substrate 310, and then a wood floor covering material 330 is applied over adhesive layer 320.

Figure 4A:
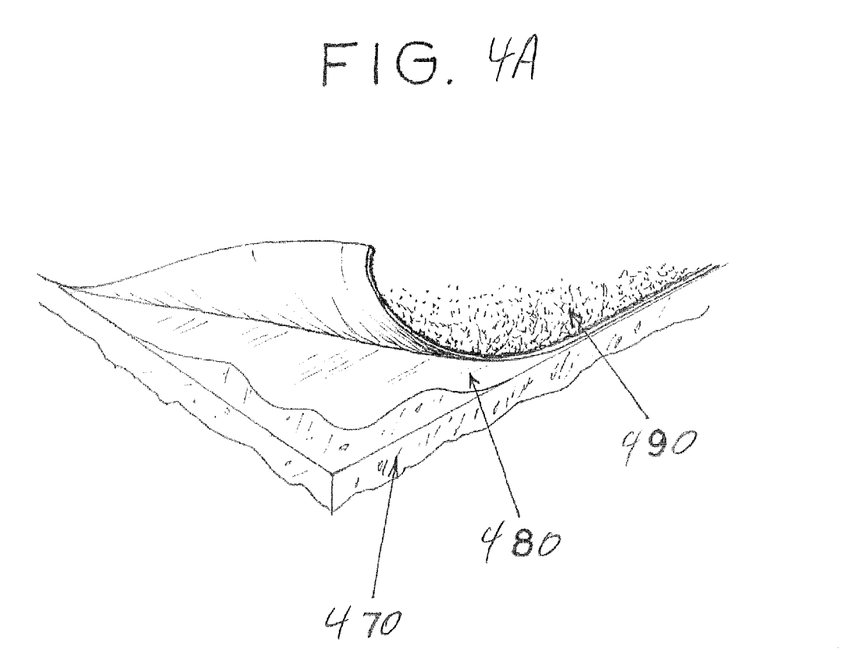
FIGS. 4A and 4B are a perspective cut-away and a cross sectional view of a carpet or carpet tile flooring installation according to an embodiment of the present invention.
Figure 4B:
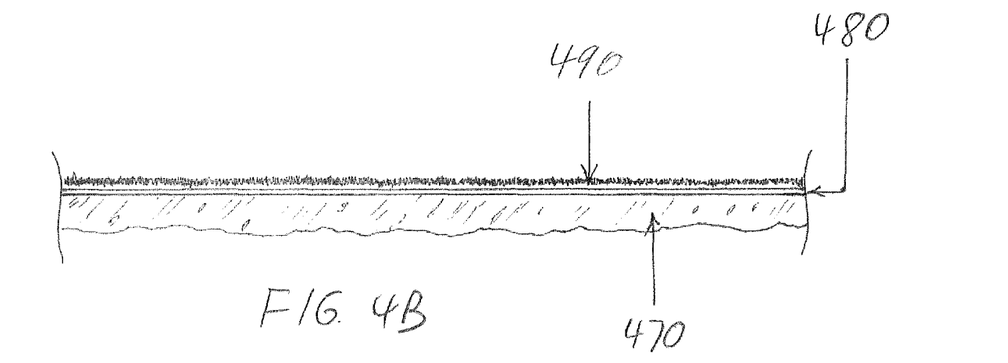

FIG. 4A is a perspective cut-away and FIG. 4B is a cross sectional view of a carpet or carpet tile flooring installation according to an embodiment of the invention. A flooring substrate 470 can be one of the following constructions; wooden, concrete, wooden and covered with an existing floor covering material, or concrete covered with an existing floor covering material. An adhesive film 480 is applied over substrate 470, and carpet or carpet tile floor covering material 490 is applied to adhesive 480.

Figure 5A:
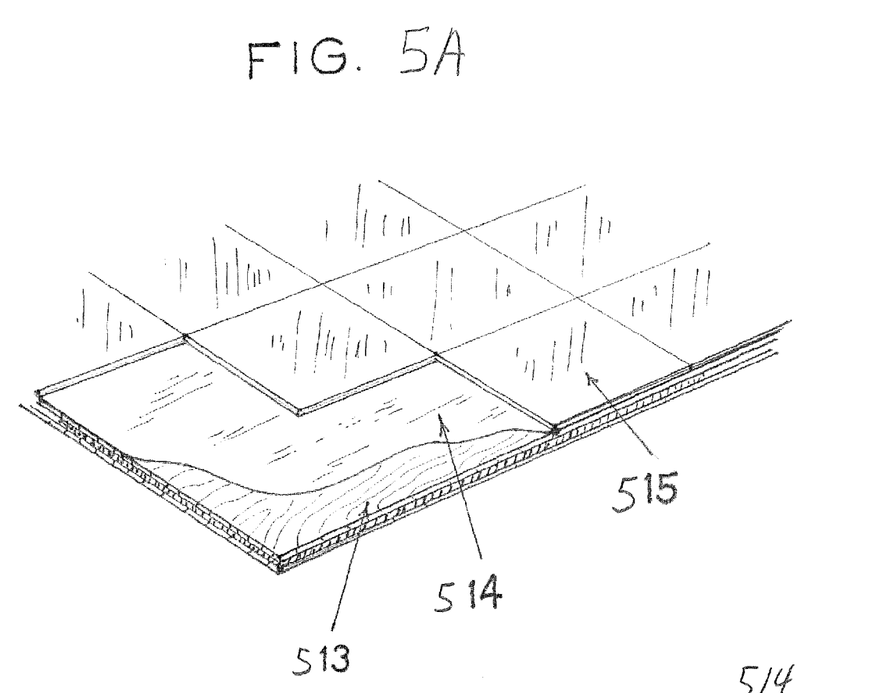
FIGS. 5A and 5B are a perspective cut-away and a cross sectional view of a vinyl composition or luxury vinyl tile or plank flooring installation according to an embodiment of the present invention.
Figure 5B:
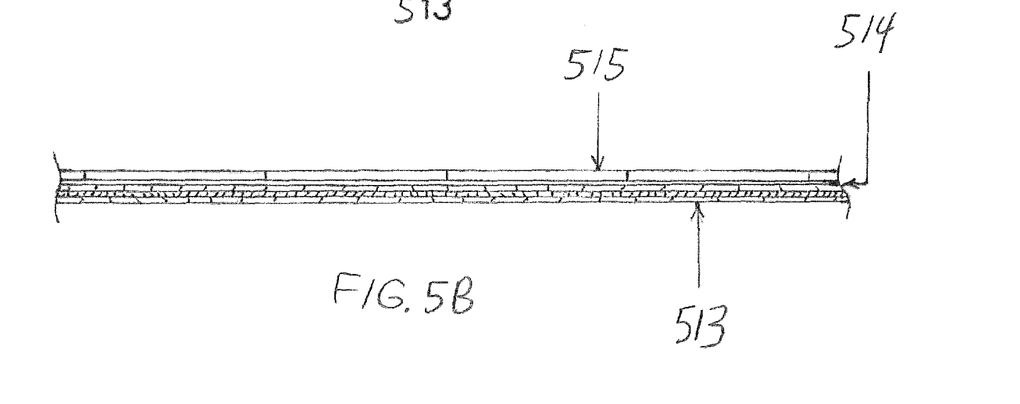

FIG. 5 is a perspective cut-away and FIG. 5B is a cross sectional view of a vinyl composition or luxury vinyl tile or plank flooring installation according to an embodiment of the present invention. A flooring substrate 513 can be one of the following constructions: wooden, concrete, wooden and covered with an existing floor covering material, or concrete covered with an existing floor covering material. A carrier free adhesive film 514 in accordance with the invention is applied to substrate 13, and a vinyl composition or luxury vinyl tile or plank floor covering material 515 applied to adhesive 514.

Adhesive systems in accordance with the invention can be formed by providing a first release liner, coating the first liner with a layer of the adhesive, then covering the layer of adhesive with second release liner. If a double-sided release liner is used, the weaker release side with higher surface energy is preferably coated, then the coated release liner is formed into a roll.

Because the release liners in accordance with the invention have low surface energy, it can be difficult to coat them with the layer of carrier free adhesive. It is therefore useful to combine the adhesive composition with a suitable wetting agent. Because of the low surface energies of the preferred silicone based release agents, a silicone release liner can require strong wetting agents to achiever proper coverage. It is preferred to select wetting agents (surfactants) to provide good wetting under dynamic conditions, while controlling or eliminating foam, so as to provide a smooth adhesive layer. The actual wetting agents used will depend on the composition and properties of the adhesive layer.

Surfactants that offer a combination of formulating benefits, including wetting, defoaming and dispersion are preferred. Preferred surfactants are produced by reacting various amounts of ethylene oxide with a nonionic molecule with a hydrophilic section in the middle of two symmetric hydrophobic groups. Adding ethylene oxide to this nonionic molecule increases the hydrophilic nature of the product, modifying its water solubility, wetting and defoaming characteristics. Depending on the ethylene oxide level, these surfactants function as low-foaming, nonfoaming or defoaming wetting agents in a variety of applications including inks, adhesives, coatings, agricultural chemicals, electroplating, oil field chemicals and paper coatings.

Surface tension reduction through the use of a surfactant allows a liquid solution to wet substrates with low surface energies. Table 1 below demonstrates the ability of the surfactants to effectively lower the equilibrium or static surface tension of water using a duNouy tensiometer. As the amount of eth-oxylation is increased, static surface tension at a specific concentration increases and the surfactant becomes more hydrophilic. This increased water solubility permits higher use levels of surfactants with high levels of ethoxylation to produce very low static surface tensions.

TABLE 1

| Equilibrium Surface Tension (dynes/cm) | | | |
|---|---|---|---|
| | Concentration in Water | | |
| Ethylene Oxide Content (moles) | 0.01% | 0.10% | 1.00% |
| 1.2 | 41.3 | 32 | Insoluble |
| 3.5 | 44.6 | 33.2 | Insoluble |
| 10 | 47 | 41.9 | 25.8 |
| 30 | 52.1 | 51.1 | 33.3 |

Reduction in static surface tension can give an indication of a surfactant's performance, but many applications never reach equilibrium. Consequently, in systems where surfaces are quickly generated (printing, metalworking, spray and roll coating, etc.), surfactants must migrate rapidly to the interface to prevent film retraction, fisheyes and other surface defects. As shown in Table 2, surfactants with low content of ethylene oxide effectively lower surface tension under conditions of rapid surface formation (increased bubble rate) due to their ability to quickly migrate to newly formed surfaces. Therefore, under dynamic conditions, these products can outperform conventional surfactants, such as octyl phenol ethoxylates.

TABLE 2

| | Ethylene Oxide Content (moles) | | | | |
|---|---|---|---|---|---|
| Relative Rate of Surface Formation (bubbles/sec) | 1.3 | 3.5 | 10 | 30 | 35 |
| | Dynamic Surface Tension (dynes/cm) | | | | |
| 1 (equilibrium) | 32 | 33.2 | 41.9 | 51.1 | 33.4 |
| 6 (dynamic) | 35.1 | 37.3 | 44.3 | 53 | 42.2 |

Water-based systems for coatings, adhesives, inks, etc., have surface tensions that are too high to permit adequate coverage of many low-energy substrates. As a result, surfactants that function as wetting agents are required. However, most surfactants cause foam, and the subsequent use of many defoamers can result in coating defects like fisheyes and cratering. The proper selection of surfactant can eliminate this problem by providing the necessary coverage with non-foaming wetting agents.

Systems with high ionic concentrations present wetting problems because of the poor electrolyte tolerance of many surfactants. Selecting the right surfactant provide good coverage in these formulations is important because they have to have high electrolyte tolerance.

In addition to wetting and reduction of surface tension the surfactant can not contribute to introduction of foam in the adhesive system. These surfactants are best described as non-foaming or, in some cases, defoaming nonionic surfactants. Since they are also strong wetting agents, these products can be used in conjunction with conventional defoamers to obtain the desired foam control while minimizing the fisheyes and pinholes caused by many defoamers.

The low surface energies of plastic films and silicone release liners require strong wetting agents to achieve proper adhesive coverage. Many wetting agents can provide the required coverage, but most also produce foam. It is therefore important that the right surfactants are selected to provide good wetting under dynamic conditions while controlling or eliminating foam, thereby ensuring consistent substrate coverage. Due to their highly hydrophilic nature, some surfactants can also cause decreased bond strength by increasing the water sensitivity of the dried adhesive. The proper surfactants that will cause little increase in water sensitivity should be selected.

In a preferred embodiment, the correct surfactant should offer the following features and application benefits:
  Rapid migration leading to low dynamic surface tension;
  Defoaming De-airentraining nature;
  Low-foaming nature;
  Stable in high electrolyte and brine systems;
  Enhance flow and leveling;
  Provide coverage over low-energy and/or contaminated substrates;
  Enhance rapid penetration of absorbent substrates;
  Wet and prevent smut formation in metalworking lubricants;
  Impart mechanical and freeze/thaw stability in latex emulsions as well as narrow particle size distribution.

In one preferred embodiment of the invention, a silicone based release agent is used on the release liner and the adhesive layer employs a non-ionic surfactant with an ethylene oxide content of about 3.5 moles.

The release agent should be selected to provide suitable release, yet remain on the adhesive layer until it is removed, leaving the layer of adhesive, intact, on the release liner with lower release properties. On the relatively higher release surface, a 180° peel (g/in) @1,200 in/min of 15 to 45, with a target of 30 is acceptable. On the relatively low release surface, values of 15 to 35, with a target of 25 are acceptable. Of course, those in the art will be able to select the surface energies of the release layers depending on the particular characteristics of the adhesive used and the requirements of the project.

In one embodiment of the invention, a continuous dry adhesive film is coated on a release liner, to a thickness between about 0.40 and 10 mils. (0.0004 and 0.010 inches), more preferably between about 0.50 and 6 mils, most preferably between about 3 and 4 mils. In another embodiment of the invention, the adhesive layer can be formed as spaced strips or beads of adhesive. For example, beads between about 1/32 inches high and 1 inch wide, between 1/32 inches and 0.5 inches high can be included as the adhesive layer. The beads should be spaced between about 0.25 and 1 inch apart. A particularly preferred bead size is about 0.25 inch high and 0.25 inch wide, spaced about 1 inch apart.

Beaded layers can be applied to the release line with slot die coating. Other coating methods in accordance with the invention include extrusion, curtain, on roll, off roll, stripe, patch or continuous coating. The beaded adhesive layer embodiments can also be constructed using a notched doctored kiss roll applicator using a standard kiss roll applicator and a serrated doctor blade.

Resins in accordance with preferred embodiments of the invention generally have softening points between 25° C. and 140° C. It has also been determined that by mixing resins with different softening points, advantageous characteristics of each resin can be realized. For example, resins with a relatively low softening point, e.g., about 95-105° C. will have up to 30-40% less green strength and cured strength than resins with a relatively high softening point in the range of e.g., 115-130° C. Softening point also affects processing and handling properties. If a softening point is too high, desired materials might be difficult to emulsify at temperatures needed for proper mixing.

In one embodiment of the invention, a resin formed with hydrocarbons having, on average, 6 or fewer carbon atoms, preferably 4-6 and most preferably 5 carbon atoms and a softening point preferably between 25° C. and 115° C. is combined with a relatively harder resin formed from hydrocarbons having an average of 7 or more, preferably 8-10, most preferably 9 carbon atoms and a softening point preferably about between 85° C. and 140° C.

In preferred embodiments of the invention, the relatively soft resin is an aliphatic hydrocarbon resin formed of hydrocarbons having an average of about 5 carbon atoms. Advantageous resins can be formed from acyclic aliphatic monomers, such as cis 1, 3 pentadiene, trans 1, 3 pentadiene, and 2-methyl 2 butene and cyclopentadienes.

Adhesive compositions in accordance with the invention also advantageously include a relatively harder hydrocarbon resin, particularly one having a higher temperature softening point in the range of 100° C. to 140° C. In particular, alkylated aromatic resins, particularly those formed from hydrocarbons having an average of 8 to 10 carbon atoms, such as those produced from C-8, C-9 and C-10 monomers, such as styrene, vinyl toluene, indene, methyl indene, alpha methyl styrene. Particularly suitable C-9 resins include petroleum aromatic hydrocarbon resins having softening points in the range 100° C. to 135° C. These relatively harder resins are advantageously included as 10 to 20%, preferably 12% to 18%. Other non-limiting examples of suitable C-9 and C-5 Resins are described below in Table 3.

TABLE 3

| Manufacturer | C-9 Resins | C-5 Resins |
| --- | --- | --- |
| Rutgers VFT AG | Novares TT120 | |
| Varziner Strasse 49, D-47138 | Novares TT130 | |
| Duisburg Germany | | |
| Sartomer Company | | Norsolene S115, |
| Oaklands Corporate Center | | Norsolene S125, |
| 502 Thomas Jones Way | | Norsolene S135 |
| Exton, PA 19341 | | |

TABLE 3-continued

| Manufacturer | C-9 Resins | C-5 Resins |
|---|---|---|
| Exxon Chemicals<br>Houston<br>2401 S. Gessner<br>Houston, TX 77063-2005, USA | | Escorez 1102<br>Escorez 1304<br>Escorez 1310LC<br>Escorez 1315<br>Escorez 1580 |
| Neville Chemical Company<br>2800 Neville Road<br>Pittsburgh, PA 15225 | Nevchem 110<br>Nevchem 120<br>Nevchem 130<br>Nevex 100 | Lx-1200<br>Lx-1200-130<br>Lx-2600-125 |
| Eastman Chemical Company<br>P.O.Box 431 Kingsport, TN 37662 | Petrorez 100<br>Petrorez 199<br>Petrorez 200 | |
| Resinall<br>3065 High Ridge Road<br>P.O. Box 8149<br>Stamford CT 06903 | Resinall 711<br>Resinall 717<br>Resinall 736<br>Resinall 737<br>Resinall 747<br>Resinall 771<br>Resinall 774 | Resinall 769 |
| TOSOH Corporation<br>Suite 600, 1100 Circle<br>75 Parkway, Atlanta, GA<br>30339-3097,<br>U.S.A. | Petcoal ® 100<br>Petcoal ® 120<br>Petcoal ® 120HV<br>Petcoal ® 140 | |
| Arakawa CHEMICAL (USA) INC.<br>625 N. Michigan Avenue - Suite #1700<br>Chicago, IL 60611 USA | Arkon SM-10<br>Arkon SP10 | |
| Grenhall Chemicals Limited<br>7686 Bath Road,<br>Mississauga, ON Canada L4T 1L2 | Resin GC100,<br>Resin GC300,<br>Resin GC400 | |
| Hercules Inc.<br>Resins Division<br>Hercules Plaza<br>1313 North Market Street<br>Wilmington, DE 19894 | Picco 5120<br>Picco 6115 | Piccotac 115<br>Piccotac B |
| Yuen Liang Industrial Co., Ltd<br>South Korea | Petroresin (yl-series, sk-series, gs-series b-series with softening point of between 90-130° C. | |
| Sunbelt Chemicals, Inc.<br>407 N. Cedar Ridge, Suite 230<br>Duncanville, Texas 75116 | SB1000<br>SB1100<br>SB140ES | R100AS<br>S105A<br>R100G |
| LUKOIL Bulgaria<br>Bulgaira<br>1421 Sofia,<br>59 A Cherni Vrah Blvd | PYROLEN 100 | |

The mixture of ingredients can be advantageously heated to a temperature above the softening point of the high temperature resin, preferably in the range of 115° C. to 140° C. with mixing, to form a generally homogeneous combination. Care should be taken to insure that the composition is not heated to a temperature too far over the softening points of the materials or it can be difficult to blend with the rest of the ingredients. Thus, after a homogeneous combination is achieved, the temperature can be reduced to a point when ease of mixing is maintained, generally approximately 115° C. to 130° C.

Surfactants, as discussed above, can be included, advantageously in the range of less than 5% by weight, advantageously 0.5 to 2.0%.

It is also advantageous to include anti-foaming agents, in particular, non-silicon anti-foaming agents. These are advantageously included as less than about 0.5 weight percent, preferably 0.05 to 0.10 weight percent.

Adhesives in accordance with the invention also advantageously include polymer emulsion materials, particularly those having carboxyl functionality to provide enhanced adhesive properties, such as those having acrylic, styrene butadiene, ethylene vinyl acetate copolymer (EVA) and vinyl acetate ethylene copolymer can be included as about 20 to 80%, preferably about 30 to 60%, more preferably about 35 to 55% of the composition. The emulsion should be maintained at a temperature of about 15 to 30° C. Ingredients 4 and 5 can then be added and mixed until uniform. Ingredients 1, 2 and 3 are then added with high shear agitation until the ingredients form a substantially homogeneous blend.

Certain compositions in accordance with the invention can also advantageously include fugitive anti-oxidants, such as oximes, such as methyl ethyl ketoxime, bactericides, fungicides and freeze/thaws stabilizers.

Compositions in accordance with the invention can also advantageously include fugitive alkali agents, such as ammonia, monomethanol amine (MEA) and triethanolamine (TEA). This alkali agent can be useful to adjust the pH of the emulsion to at least 7, preferably between about 8 and 10 before the oxazoline containing component is added.

In another non-limiting embodiment of the invention, the process by which the adhesive in accordance with the invention is made can be split into two stages. The first stage can comprise the blending of the first seven ingredients and storing, with constant slow agitation, the resulting mixture as a premix to be used the final blend. The second stage comprises blending the last ingredient with the premix.

Prior to blending the premix with the remaining ingredients, the premix may be cooled to a temperature preferable in the range of 75° F. to 110° F. The cooling may occur using such devices as: a cooling jacket with cold water, a cooling jacket with a cooling tower, heat exchanger, a flash vacuum cooling system, or any other cooling device that can lower the temperature to within the desired range. Heat exchangers such as shell and tube heat exchangers, spiral heat exchangers, plate and frame heat exchangers, or compabloc welded plate heat exchangers may be used.

After blending the premix with the remaining ingredients and prior to packaging the composition, the final temperature of the batch should be cooled to a temperature of preferably not more than 90° F.

Areas designed to house electrical equipment or various manufacturing or testing procedures often need to avoid the build-up of static electricity. In another non-limiting embodiment of the invention, adhesives in accordance with the invention can be rendered electrically conductive. Conductive adhesive are advantageously used in constructing Electro-static Dissipative Floors (ESD) by the inclusion of electro-conductive agents in the adhesive composition. Particularly suitable electro-conductive agents include carbon black, synthetic conductive fibers, electrically conductive metal chips or fragments, or any other conductive materials such as conductive nano materials.

The following examples identify preferred ingredients, percentage of components and mixing processes in accordance with preferred embodiments of the invention as set forth in Examples 1-3 below. These examples are set forth for purposes of illustration and are not intended to be construed in a limiting sense.

EXAMPLE 1

Carrier Free Adhesive Film Composition

| | Ingredient | Amount wt % | Process |
|---|---|---|---|
| 1 | Drying Oil such as Linseed oil, Tung Oil, Sunflower Oil, Blown and Heated-bodied Oil, Cashew Shell Oil, Castor Oil, Coconut Oil, Cotton Seed Oil, Dicyclopentadiene Copolymers, Fatty Acids, Fish Oil, Oiticica Oil, Rapeseed Oil, Safflower Oil, Sesame Oil, Soybean Oil, Sythentic Oils, Tall Oil, Vinyltoluene Copolymers, Walnut Oil, Naptheneic Oil, Parrafinic Oil. | 4 to 10 | Blend ingredients that make up the aliphatic C-5 hydrocarbon reson with ingredient 1 (the drying oil) resulting in a mixture with a ratio of between 30:60 and 60:40. |
| 2 | Aliphatic C-5 Hydrocarbon Resin with a softening point of between 75° and 115° C., produced from Acyclic Aliphatic monomers such as Cis 1,3 Pentadiene, Trans 1,3 Pentadiene, 2-Methyl 2 Butene | 4 to 10 | |
| 3 | Alkylated Aromatic C-9 Resin with a softening point of between 100° and 140° C., produced from C8 to C-10 monomers such as Styrene, Vinyl Toluene, Indene, Methyl Indene, Alpha Methyl Styrene. Derivatives of natural tackifiers such as Gum Rosin, Tall Oil Rosin, Wood Rosin. Examples of these are Rosin Esters with softening point between 25° C. and 130° C. | 10 to 20 | Ingredient 3 is dissolved in the above mixture (ingredients 1 and 2) at temperatures of between 240° and 300° F. to form a homogenous solution. |
| 4 | Surfactants, such as 1 to 10 mole ethoxylates of nonylphenols. | 0.50 to 1.50 | Ingredients 1 through 5 must be premixed and then heated and maintained at temperature between 240° and 260° F. |
| 5 | Non-Silicon Anti-foaming agents | 0.05 to 0.10 | |
| 6 | Latex Polymer with Carboxyl Functionality, such as Acrylic, Styrene Butadiene, EVA, VAE. | 30 to 60 | Pre-heat and maintain the temperature of ingredient 6 to between 60° and 100° F. Add the premixed ingredients above to ingredient 6 with high shear agitation until ingredients form a homogenous emulsion. |
| 7 | Fugitive anti-oxidants, Bactericide, Fungicides, and Freeze-Thaw Stabilizers | 0.10 to 1.00 | Add while agitating |
| | Stage one is the blending of the first 7 ingredients and storing (with constant slow agitation) the resulting mixture as a premix to be used in the final blend. Prior to blending the premix above with the rest of the ingredients below, the premix is cooled to a temperature of between 75° F. and 110° F. | | |
| 8 | Fugitive alkali agent, such as Ammonia, MEA, TEA | 0.10 to 1.00 | Use the alkali to adjust the above emulsion pH to between 8-10 before adding ingredients 9 and 10 |
| | The final temperature of the batch must be cooled to a temperature of not more than 90° F., prior to packaging. | | |

EXAMPLE 2

Carrier Free Adhesive Film Composition

| | Ingredient | Amount wt % | Process |
|---|---|---|---|
| 1 | Process Oils such as; Naptheneic Oil, Parrafinic Oil. | 4 to 15 | Ingredient 2 is dissolved in the above mixture (ingredients 1) at temperatures of between 240° and 300° F. to form a homogenous solution. |
| 2 | Tackyfying Resins such as; Alkylated Aromatic C-9 Resin with a softening point of between 100° and 140° C., produced from C8 to C-10 monomers such as Styrene, Vinyl Toluene, Indene, Methyl Indene, Alpha Methyl Styrene. Aliphatic C-5 Hydrocarbon Resin with a softening point of between 75° and 115° C., produced from Acyclic Aliphatic monomers such as Cis 1,3 Pentadiene, Trans 1,3 Pentadiene, 2-Methyl 2 Butene Derivatives of natural tackifiers such as Gum Rosin, Tall Oil Rosin, Wood Rosin. Examples of these are Rosin Esters with softening point between 25° C. and 130° C. | 9 to 20 | |
| 3 | Surfactants, such as 1 to 40 mole ethoxylates of nonylphenols. | 0.50 to 2.00 | Ingredients 1 through 5 must be premixed and then heated and maintained at temperature between 180° and 200° F. |
| 4 | Non-Silicon Anti-foaming agents | 0.05 to 0.10 | Pre-heat and maintain the temperature of ingredient 6 to between 60° and 100° F. Add the premixed ingredients above to ingredient 6 with high shear agitation until ingredients form a homogenous emulsion. |
| 5 | Latex Polymer such as Acrylic, Styrene Butadiene, EVA, VAE. | 30 to 60 | |
| 6 | Bactericide, Fungicides, and Freeze-Thaw Stabilizers | 0.10 to 1.00 | Add while agitating |

Stage one is the blending of the first 6 ingredients and storing (with constant slow agitation) the resulting mixture as a premix to be used in the final blend. Prior to blending the premix above with the rest of the ingredients below, the premix is cooled to a temperature of between 75° F. and 110° F.

| | | | |
|---|---|---|---|
| 7 | Fugitive alkali agent, such as Ammonia, MEA, TEA | 0.10 to 1.00 | Use the alkali to adjust the above emulsion pH to between 8-10 before adding ingredients 9 and 10 |

The final temperature of the batch must be cooled to a temperature of not more than 90° F., prior to packaging.

EXAMPLE 3

Carrier Free Adhesive Film Composition

| | Ingredient | Amount wt % | Process |
|---|---|---|---|
| 1 | Process Oils such as; Naptheneic Oil, Parrafinic Oil. | 4 to 15 | |
| 2 | Tackyfying Resins such as; Alkylated Aromatic C-9 Resin with a softening point of between 100° and 140° C., produced from C8 to C-10 monomers such as Styrene, Vinyl Toluene, Indene, Methyl Indene, Alpha Methyl Styrene. Aliphatic C-5 Hydrocarbon Resin with a softening point of between 75° and 115° C., produced from Acyclic Aliphatic monomers such as Cis 1,3 Pentadiene, Trans 1,3 Pentadiene, 2-Methyl 2 Butene | 10 to 20 | Ingredient 2 is dissolved in the above mixture (ingredients 1) at temperatures of between 240° and 300° F. to form a homogenous solution. |
| 3 | Surfactants, such as 1 to 10 mole ethoxylates of nonylphenols. | 0.50 to 1.50 | Ingredients 1 through 5 must be premixed and then heated and maintained at temperature between 240° and 260° F. |
| 4 | Non-Silicon Anti-foaming agents | 0.05 to 0.10 | |

| | | |
|---|---|---|
| 5 Latex Polymer such as Acrylic, Styrene Butadiene, EVA, VAE. | 30 to 60 | Pre-heat and maintain the temperature of ingredient 6 to between 60° and 100° F. Add the premixed ingredients above to ingredient 6 with high shear agitation until ingredients form a homogenous emulsion. |
| 6 Bactericide, Fungicides, and Freeze-Thaw Stabilizers | 0.10 to 1.00 | Add while agitating |
| Stage one is the blending of the first 6 ingredients and storing (with constant slow agitation) the resulting mixture as a premix to be used in the final blend. Prior to blending the premix above with the rest of the ingredients below, the premix is cooled to a temperature of between 75° F. and 110° F. | | |
| 7 Fugitive alkali agent, such as Ammonia, MEA, TEA | 0.10 to 1.00 | Use the alkali to adjust the above emulsion pH to between 8-10 before adding ingredients 9 and 10 |
| The final temperature of the batch must be cooled to a temperature of not more than 90° F., prior to packaging. | | |

It will thus be seen that the objects set forth above, among those made apparent from the preceding description, are efficiently attained, and, since certain changes may be made in carrying out the above method and in the compositions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of installing flooring on a sub-floor flooring substrate at a flooring installation site, comprising:
   providing an adhesive system including an adhesive layer consisting essentially of curable one component adhesive and having no carrier layer support structure therein, one side of the adhesive layer being disposed on a low surface energy release surface and the other side of the adhesive layer disposed on a relatively higher surface energy release surface at the flooring installation site;
   separating the adhesive layer from the lower surface energy release surface and adhering the resulting exposed side of the adhesive layer onto a sub-floor flooring substrate;
   separating the higher surface energy release surface from the adhesive layer to expose the adhesive layer on the sub-floor flooring substrate; and
   before the adhesive layer cures adhering flooring material on the layer of adhesive that is adhered to the sub-floor flooring substrate and allowing the adhesive layer to cure whereby the flooring material becomes adhered to the sub-floor flooring substrate by the cured adhesive layer.

2. The method of claim 1, wherein the lower and higher surface energy surfaces are on opposite sides of a same release liner, which is formed into a roll, with the lower surface energy side of the release liner on the outside of the roll.

3. The method of claim 1, wherein the adhesive layer has a thickness of from about 0.4 mils to about 10 mils and the flooring comprises wood or tile.

4. The method of claim 3, wherein the adhesive is formed from bio-based or renewable materials.

5. The method of claim 3, wherein the adhesive is formulated to have substantially no VOC emissions.

6. The method of claim 1, wherein the adhesive layer comprises an oil component, a hydrocarbon resin and latex polymer material.

7. The method of claim 1, wherein the adhesive comprises non-ionic ethoxylated surfactants.

8. The method of claim 1, wherein the adhesive layer includes about 4-10 wt. % C-5 hydrocarbon resin, about 4-10 wt. % C-9 hydrocarbon resin, and about 30 wt. % to 60 wt. % latex polymer.

9. The method of claim 8, wherein the adhesive layer comprises about 0.50% to 2% of 1 to 40 mole ethoxylates of a nonylphenol surfactant.

10. The method of claim 8, wherein the sub-floor flooring substrate comprises wood or concrete and the flooring comprises wood or tile.

11. The method of claim 1, wherein the adhesive layer contains surfactants which permit the adhesive material of the adhesive layer to substantially wet selected areas of the release surface.

12. The method of claim 11, wherein the surfactants comprise non-ionic ethylene oxide based molecules.

13. The method of claim 1, wherein each of the lower and higher energy release surfaces comprises silicone based release agents.

14. The method of claim 1, wherein the adhesive layer comprises an anti-foaming agent.

15. The method of claim 1, wherein the lower energy release surface is on a first release liner and the higher energy release surface is on a second release liner.

16. The method of claim 1, wherein the adhesive is formed from bio-based or renewable materials.

17. The method of claim 1, wherein the adhesive is formulated to have substantially no VOC emissions.

18. The method of claim 1, wherein the higher release energy surface layer has at least a 180° peel (g/in) at 1,200 in/min of 15 to 45.

19. The method of claim 1, wherein the adhesive layer has a thickness between about 3 mils and about 4 mils.

20. The method of claim 1, wherein the adhesive layer is in the form of an arrangement of stripes.

21. The method of claim 1, wherein the adhesive contains a resin formed with hydrocarbons having 4 to 6 carbon atoms.

22. The method of claim 21, further comprising resins formed with hydrocarbons having, on average, 8 to 10 carbon atoms.

23. The method of claim 22, further comprising a drying oil.

24. The method of claim 1, wherein the sub-floor flooring substrate comprises wood or concrete.

25. The method of claim 24, wherein the flooring comprises wood or tile.

* * * * *